United States Patent [19]

Epworth

[11] Patent Number: 5,523,874
[45] Date of Patent: Jun. 4, 1996

[54] OPTICAL SOLITON PULSE TRANSMISSION SYSTEM

[75] Inventor: Richard E. Epworth, Sawbridgeworth, United Kingdom

[73] Assignee: Northern Telecom Limited, Montreal, Canada

[21] Appl. No.: 170,043

[22] Filed: Dec. 17, 1993

[30] Foreign Application Priority Data

Jan. 23, 1993 [GB] United Kingdom ............... 9301326

[51] Int. Cl.⁶ ................................................ H04B 10/00
[52] U.S. Cl. .................... 359/161; 359/166; 359/187
[58] Field of Search .................................... 359/160–161, 359/166, 173, 187, 194

[56] References Cited

U.S. PATENT DOCUMENTS 5,140,656  8/1992  Hasegawa et al. ............... 359/173
5,276,543  1/1994  Olshansky ........................ 359/161
5,357,364  10/1994  Gordon et al. .................. 359/173

Primary Examiner—Leo Boudreau
Assistant Examiner—Kinfe-Michael Negash
Attorney, Agent, or Firm—Lee, Mann, Smith, McWilliams, Sweeney & Ohlson

[57] ABSTRACT

An existing proposal to limit jitter and ASE noise generation in an optical soliton transmission system by the use of a concatenation of passive optical filters, each with its centre frequency offset in the same direction with respect to that of its predecessor in the transmission path, is modified by the replacement of the passive filters with active ones. In each active filter a feedback control loop operates to tune the centre frequency of the filter to provide a specific offset with respect to the centre frequency of solitons incident upon it.

12 Claims, 2 Drawing Sheets

OPTICAL SOLITON PULSE TRANSMISSION SYSTEM

BACKGROUND TO THE INVENTION

A basic optical soliton pulse transmission system is similar to a "linear" transmission system, with the principal differences that the soliton system uses Return to Zero pulses of $sech^2$ shape (instead of NRZ pulses), and transmits them along fibre with anomalous dispersion (instead of low normal dispersion). Soliton transmission systems, though offering the potential of higher capacity than 'linear' optically amplified systems, are limited by several additional effects, particularly interaction between adjacent soliton pulses, noise induced pulse jitter (Gordon-Haus) effect, and constraints on the power of the solitons leading to noise problems.

These problems can be ameliorated by reshaping the pulses in their passage along the transmission path without going to the extent of a full regeneration. Thus M. Nakazawa et al have described, in a paper entitled '10 Gbit/s Soliton Data Transmission over One Million Kilometers', Electronics Letters, Jul. 14th 1991, Vol. 27, No. 14, pp 1270–2, how soliton pulses can, at intervals along the route, be reshaped by passage through sinusoidal modulators. An alternative approach, which similarly involves introducing additional components along the route, involves passage of the soliton pulses through frequency selective filters. The Gordon-Haus effect produces unwanted frequency shifts in the solitons, and these frequency shifts give rise to jitter as the result of the effects of dispersion. Successive filters at intervals along the route selectively attenuate the spectrum and minimise the extent to which the soliton centre frequency can drift away from the frequency with which it was initially launched into the system. Such filters thus operate to constrain the magnitude of the Gordon-Haus jitter. One advantage of this approach is that the filters may be interference type filters having a regular array of pass and stop bands that can be arranged to have a spectral periodicity suitable for use in a wavelength division multiplexed (WDM) soliton pulse transmission system. On the other hand if, as originally proposed, all the filters are tuned to the same frequency, then accumulated amplifier noise, amplified spontaneous emission (ASE), is able to propagate along the route in a manner that is inhibited by the previously referred to modulator approach. This noise is worse than in the absence of the filters because extra amplification has had to be included in the system in order to offset the loss penalty of the filters. This problem is addressed by L. F. Mollenauer et al, in a paper entitled 'The Sliding-frequency guiding filter: an improved form of soliton jitter control', Optics Letters, Nov. 15, 1992, Vol. 17, No. 22, pp. 1575–7. In this paper it is proposed that there is a small consistently positive, or consistently negative, frequency offset between the centre frequency of each filter in the system and that of the filter immediately preceding it. The paper specifically considers a numerical simulation of a system in which the aggregate centre frequency offset over a distance of 10,000 km is 56 GHz and amounts to three times the bandwidth of an individual soliton. The frequency offset is spread over approximately 350 concatenated filters, one at each amplifier. The soliton pulses are able to get through the system because a soliton pulse is able gradually to readjust its spectrum as it proceeds. This contrasts with the situation in respect of the (linear) noise, most of which is blocked because the filter pass bands down the whole system do not overlap. Thus it is only the noise generated in the last few amplifiers that is able to reach the far end of the system. The small offset in centre frequency of each filter biases, in the direction of the offset, the transmitted spectrum of every soliton pulse that passes through it. Some power is thereby lost but, provided that there is sufficient optical amplification to compensate, the soliton adjusts to become a soliton at a new offset frequency. Provided that this is done repeatedly in a large number of very small steps, then the soliton centre frequency can be made to shift gradually as it progresses down the system.

The concluding paragraph of this paper asserts certain advantages to flow from the fact that this system of jitter control uses entirely passive filters. This is specifically contrasted in this paper with the time-domain filtering of the previously referenced M. Nakazawa et al. paper, which uses active devices that this (L. F. Mollenauer et al.) paper characterises as having 'all the same drawbacks of complexity reduced reliability high cost and incompatibility with wavelength division multiplexing that accompany electronic regeneration'.

Against this alleged advantage pertaining to the use of passive filters, it must be recognised that the practical realisation of approximately 350 filters, each with a centre frequency shifted by approximately 157 MHz with respect to the centre frequencies of its immediate neighbours, is an onerous task not mitigated by the fact that, if the system is to be suitable for submarine transmission system applications, it is typically going to be necessary for stability to be maintained over 25 years.

SUMMARY OF THE INVENTION

The present invention is directed towards the provision of a system that employs a relatively simple form of active filters instead of passive ones.

According to the present invention there is provided an optical soliton transmission system that includes a concatenation of active optical filters each having a centre frequency and providing an optical attenuation of an optical signal incident upon that filter, wherein each active filter incorporates measurement means to measure said optical attenuation and provide an output applied to adjustment means which adjusts said centre frequency to bring said attenuation to a predetermined value.

The frequency selective element of such an active filter may comprise a Fabry Perot type filter whose centre frequency is controllable for instance by temperature, magnetostriction, piezo-electric or electro-optic tuning.

The invention also provides an active filter for an optical soliton transmission system, which active filter exhibits a centre frequency and includes a feedback loop adapted to offset said centre frequency from that of an optical signal incident upon said filter by an amount providing a predetermined attenuation of that incident signal by said filter.

BRIEF DESCRIPTION OF THE DRAWINGS

There follows a description of a soliton transmission system embodying the invention in a preferred form, and particularly of one of its active filters. The description refers to the accompanying drawings, in which.

DETAILED DESCRIPTION OF THE PREFERRED EMBODIMENTS

Figure 1:
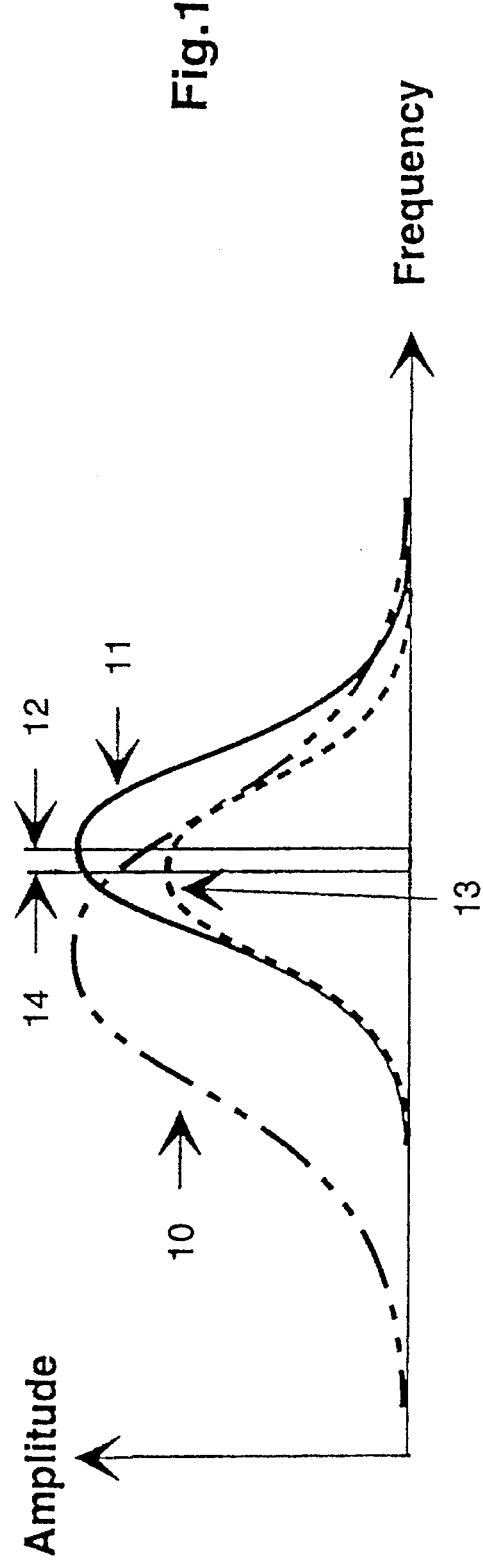
FIG. 1 depicts the frequency response of one of the active filters and the frequency spectrum of a soliton pulse before and after its passage through that filter.

The basic elements of a soliton transmission system of the present invention are a transmitter and a receiver linked by a transmission path whose dispersion characteristics are such as to permit solitons generated at the transmitter to propagate to the receiver. The transmission path includes a concatenation of optical amplifiers, and also a concatenation of optical filters, each filter with its centre frequency offset with respect to that of its predecessor in the system. Either the centre frequency of each such filter is at a slightly greater frequency than that of its predecessor in the system, or it is at a slightly reduced frequency. FIG. 1 depicts the situation in which the offset is of the latter type, the type that produces 8 gradual lowering of the centre frequency of solitons in their passage along the system. This lowering may be preferred because a lowering of the frequency is also encouraged by the Raman Self Frequency Shift effect. In this figure the filter response of a particular filter of the system is depicted by curve 10, and the solitons which are incident upon it have a frequency spectrum depicted by curve 11 that has its centre frequency at 12. In their passage through this filter the frequency spectrum of these solitons is converted to that given by curve 13 whose centre frequency is at 14.

Figure 3:
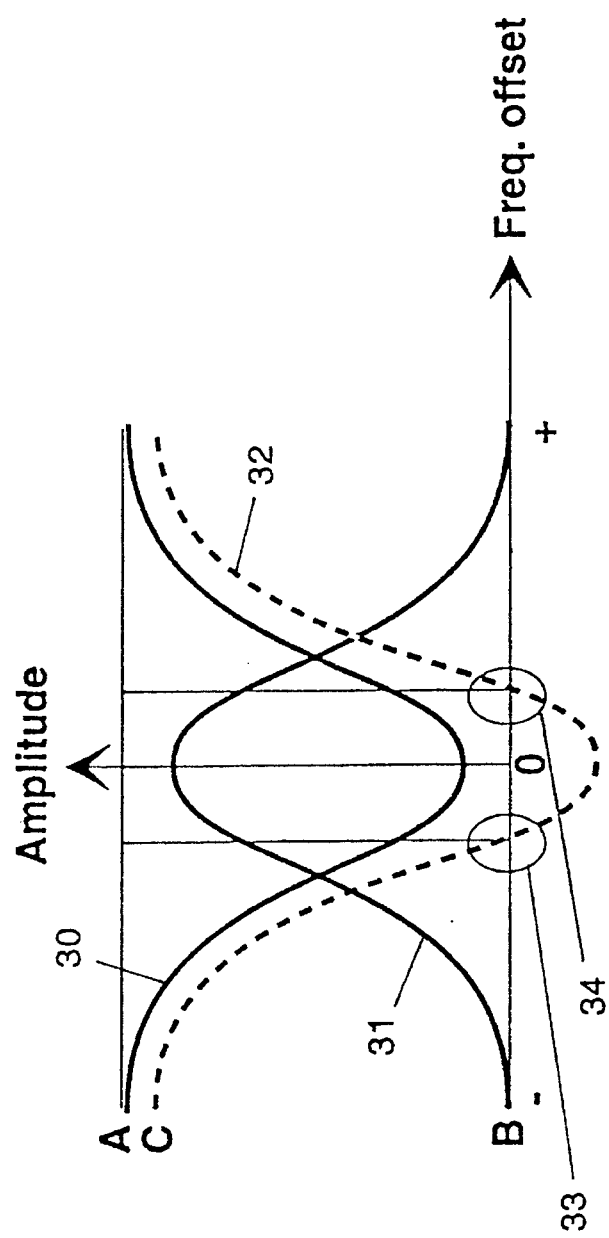
FIG. 3 depicts, as a function of frequency offset, the signals appearing at various positions in the feedback control loop of the active filter.
Figure 2:
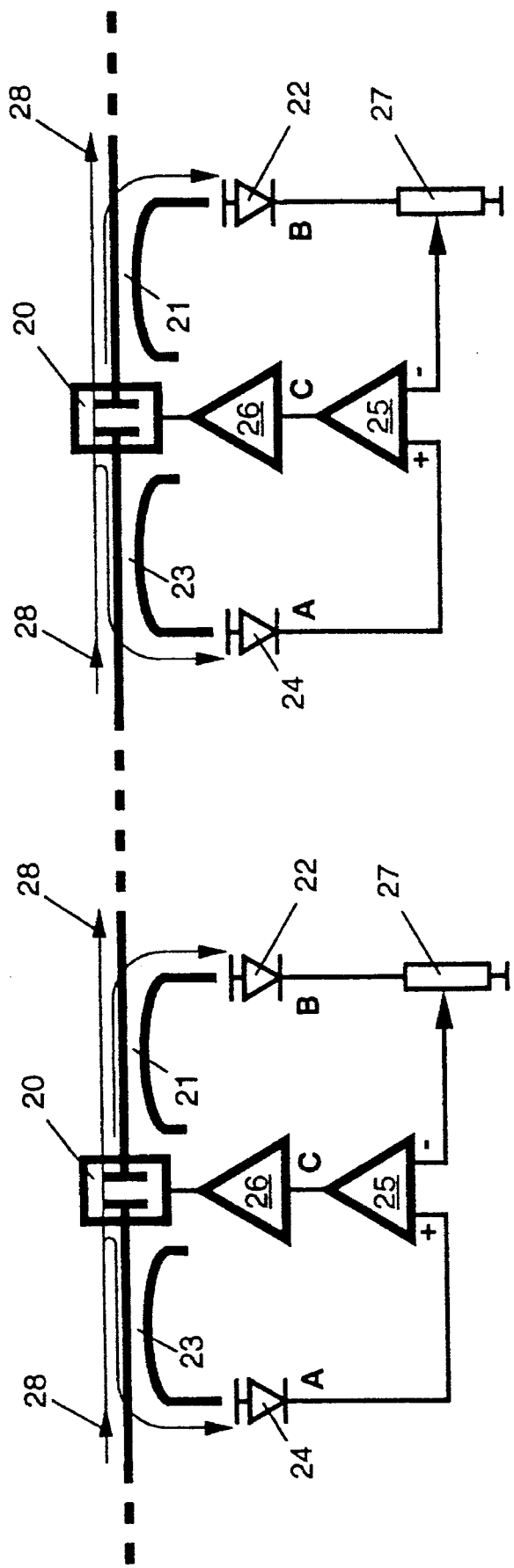
FIG. 2 is a block diagram of the active filter.

Thus far in the specific description, the transmission system has not been distinguished from that of the system of the Mollenauer paper to which previous reference has been made. It is distinguished in that it uses active filters (actively controlled filters), whereas the system of the Mollenauer paper uses entirely passive filters. A block diagram of one of the active filters of the present system is depicted in FIG. 2. The components of this active filter consist of an electronically tuneable Fabry Perot filter 20, tuneable for instance by temperature regulation, magneto-striction, piezo-electric or electro-optic tuning, two optical power taps 21, 23 and their associated photodetectors 22, 24, a differential amplifier 25, a power amplifier 26 for driving the means by which the Fabry Perot filter 20 is tuned, and a variable attenuator 27. The active filter is positioned within the system such that optical solitons propagate in the direction of the arrows 28. Optical tap 21, which may conveniently take the form of a tapered fused fibre coupler, takes a proportion of the optical soliton power transmitted by the Fabry Perot filter 20, and directs it on to photodetector 22 to provide an electrical signal, B, proportional to the transmitted soliton power. Similarly, optical tap 23, which also may conveniently take the form of a tapered fused fibre coupler, takes a proportion of the incident soliton power that is reflected by the Fabry Perot filter 20, and directs it on to photodetector 24 to provide an electrical signal A, proportional to the reflected soliton power. With the feedback loop incapacitated, the magnitudes of the signals A and B vary, respectively as depicted by curves 30 and 31 in FIG. 3, as a function of the tuning of the filter 20. In particular FIG. 3 shows the magnitude of B passing through a maximum, and that of A passing through a minimum, as the filter centre frequency is swept through the centre frequency of the incident solitons. The two constants of proportionality, respectively relating the electrical signal B to the transmitted soliton optical power, and relating the electrical signal A to the reflected optical power are not necessarily identical, and so in general the magnitude of signal A will not be equal to that of signal B under the filter tuning condition providing the desired frequency offset. Accordingly the smaller of the two signals A and B is fed directly to one input of the differential amplifier 25, while the larger one is fed to its other input via the attenuator 27. (For purposes of illustration it has been assumed in FIG. 2 that signal B is the larger of the two.) With the feedback loop still incapacitated, the output, C, of the differential amplifier 25 varies as depicted by curve 32 in FIG. 3 as a function of the tuning of the filter 20. Completion of the feedback loop, by using the output of power amplifier 26 to regulate the tuning of the filter 20, then serves to stabilise the operating point of the tuneable filter either to point 33 or to point 34 depending upon the sign of the loop gain of the feedback loop.

The active filter of FIG. 2 obtains a measure both of the transmitted optical soliton power and of the reflected power. Both these measures are employed in obtaining the power ratio signal that is used in the feedback loop for regulation of the centre frequency of the filter in relation to that of the solitons incident upon it. If however the filter is at a point of constant optical power in the system, for instance because it is located immediately downstream of an AGC'd or saturated optical amplifier, then the requisite ratio can be obtained from using only one of these measures in conjunction with knowledge of the value of the constant power level of the incident solitons.

It should also be understood that either or both of the optical taps 21, 23 may be provided by integers having other functions within the system. Thus the reflected power tap 23 can be provided by the spare port of an optical circulator or of an optical isolator.

An additional advantage of this use of active filters is that, with the exception of coupling losses, their use serves to stabilise the loss presented by each filter and thus helps to stabilise the loss of the overall transmission path.

We claim:

1. An optical soliton transmission system that includes a concatenation of active optical filters each having an optical input optically coupled with an optical output via a centre-frequency-tuneable band-pass optical filter element having a centre frequency tuning control input, to which filter element is connected optical attenuation measurement means which has at least one optical input connected to the filter element and an output which provides, in response to the application of optical solitons to the active filter, a control signal the magnitude of which is functionally dependent upon the attenuation of said optical solitons provided by the filter element, wherein the output of the optical attenuation measurement means is connected to the centre frequency tuning control input of the filter element.

2. An optical soliton transmission system as claimed in claim 1, wherein the tuneable filter element and optical attenuation measurement means co-operate to tune the centre frequency of the filter element to a value less than that of the solitons incident upon the filter element.

3. An optical soliton transmission system as claimed in claim 2, wherein the tuneable filter element of each of the active optical filters comprises a tuneable Fabry Perot filter that reflects a first portion of the power of the optical solitons incident upon the filter element and transmits a second portion.

4. An optical soliton transmission system as claimed in claim 3, wherein said at least one optical input of the measurement means of each active filter comprises first and second optical inputs respectively coupled to first and second detectors respectively to provide measures of the reflected and transmitted power portions of the optical solitons incident upon the filter element.

5. An optical soliton transmission system as claimed in claim 1, wherein the tuneable filter element and optical attenuation measurement means co-operate to tune the centre frequency of the filter element to a value greater than that of the solitons incident upon the filter element.

6. An optical soliton transmission system as claimed in claim 5, wherein the tuneable filter element of each of the active optical filters comprises a tuneable Fabry Perot filter that reflects a first portion of the power of the optical solitons incident upon the filter element and transmits a second portion.

7. An optical soliton transmission system as claimed in claim 6, wherein said at least one optical input of the measurement means of each active filter comprises first and second optical inputs respectively coupled to first and second detectors respectively to provide measures of the reflected and transmitted power portions of the optical solitons incident upon the filter element.

8. An optical soliton transmission system as claimed in claim 1, wherein the tuneable filter element of each of the active optical filters comprises a tuneable Fabry Perot filter that reflects a first portion of the power of the optical solitons incident upon the filter element and transmits a second portion.

9. An optical soliton transmission system as claimed in claim 8, wherein said at least one optical input of the measurement means of each active filter comprises first and second optical inputs respectively coupled to first and second detectors respectively to provide measures of the reflected and transmitted power portions of the optical solitons incident upon the filter element.

10. An active filter for an optical transmission system, which active filter comprises a centre-frequency-tuneable band-pass optical filter element provided with a centre frequency control input connected in a feedback control loop that is adapted to regulate the centre frequency of the filter element, which feedback control loop includes optical attenuation measurement means adapted, in response to the application of optical solitons to the filter element, to generate, at an output of said means, a feedback control loop signal which has a magnitude that is functionally dependent upon the attenuation of said optical solitons provided by the filter element, and which feedback control loop signal is employed in the feedback control loop to regulate the attenuation provided by the filter element to said solitons.

11. An active filter for an optical soliton transmission system, which filter is as claimed in claim 10, wherein the filter element of the active filter comprises a tuneable Fabry Perot filter that reflects a first portion of the power of the optical solitons incident upon the filter element and transmits a second portion.

12. An active filter for an optical soliton transmission system, which active filter is as claimed in claim 11, and wherein said feedback control loop signal is derived from a ratio of the magnitude of the first and second portions.

\* \* \* \* \*